US012190313B2

(12) United States Patent
Dubey et al.

(10) Patent No.: US 12,190,313 B2
(45) Date of Patent: Jan. 7, 2025

(54) SYSTEMS AND METHODS FOR CARD REPLACEMENT

(71) Applicant: JPMORGAN CHASE BANK, N.A., New York, NY (US)

(72) Inventors: Shruti Dubey, New York, NY (US); Shruti K. Patel, New York, NY (US); June M. Leonardi, Glen Mills, PA (US); Navneet Kang, Garnet Valley, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 91 days.

(21) Appl. No.: 16/576,519

(22) Filed: Sep. 19, 2019

(65) Prior Publication Data

US 2021/0090071 A1  Mar. 25, 2021

(51) Int. Cl.
  *G06Q 20/36*  (2012.01)
(52) U.S. Cl.
  CPC ............... *G06Q 20/3672* (2013.01)
(58) Field of Classification Search
  CPC .................................. G06Q 20/3672
  See application file for complete search history.

(56) References Cited

U.S. PATENT DOCUMENTS

| 6,715,672 | B1 * | 4/2004 | Tetro | G06Q 20/4014 |
| | | | | 235/382 |
| 7,962,418 | B1 * | 6/2011 | Wei | G06Q 20/12 |
| | | | | 705/68 |
| 2006/0165060 | A1 * | 7/2006 | Dua | G06Q 20/322 |
| | | | | 705/76 |
| 2012/0303425 | A1 * | 11/2012 | Katzin | G06Q 20/4016 |
| | | | | 705/16 |
| 2013/0159178 | A1 * | 6/2013 | Colon | G06Q 20/36 |
| | | | | 705/41 |
| 2013/0334308 | A1 * | 12/2013 | Priebatsch | G06K 7/1417 |
| | | | | 235/383 |
| 2013/0346305 | A1 * | 12/2013 | Mendes | G06Q 20/351 |
| | | | | 705/41 |
| 2014/0006277 | A1 * | 1/2014 | Rao | G06Q 20/3572 |
| | | | | 705/41 |

(Continued)

*Primary Examiner* — Alaaeldin M. Elshaer
*Assistant Examiner* — Pierre L Maccagno
(74) *Attorney, Agent, or Firm* — GREENBERG TRAURIG LLP

(57) ABSTRACT

Systems and methods for card replacement are disclosed. In one embodiment, in a card issuer backend comprising at least one computer processor, a method for card replacement may include: receiving, from a cardholder, a request to replace a lost card; determining that the lost/not received card has not been provisioned to an electronic wallet associated with the cardholder; generating a token for the lost card; provisioning the token to the electronic wallet; generating a replacement card number for the lost card; requesting that a token service provider assign the token for the lost card to the replacement card number; and updating a customer profile with the replacement card information. The token service provider may change an association of a token from being associated with the lost card to being associated with the replacement card, and may provide the electronic wallet with replacement card information via an electronic wallet provider.

6 Claims, 2 Drawing Sheets

(56) References Cited

U.S. PATENT DOCUMENTS

| | | | |
|---|---|---|---|
| 2014/0195425 A1* | 7/2014 | Campos | G06K 19/06206 |
| | | | 705/41 |
| 2014/0249948 A1* | 9/2014 | Graylin | G06Q 20/202 |
| | | | 705/21 |
| 2016/0292673 A1* | 10/2016 | Chandrasekaran | G06Q 20/40 |
| 2017/0032362 A1* | 2/2017 | Lahkar | G06Q 20/3674 |
| 2017/0032370 A1* | 2/2017 | Beltramino | G06Q 20/20 |
| 2017/0132627 A1* | 5/2017 | Phillips | G06Q 30/0613 |
| 2017/0249689 A1* | 8/2017 | O'Neill | G06Q 30/0635 |
| 2018/0276656 A1* | 9/2018 | Goyal | G06Q 20/351 |
| 2018/0276657 A1* | 9/2018 | Cho | G06Q 20/3223 |
| 2019/0066089 A1* | 2/2019 | Miryala | G06Q 20/367 |
| 2019/0188121 A1* | 6/2019 | Simon | G06Q 20/0855 |
| 2019/0197527 A1* | 6/2019 | Agarwalla | G06Q 20/3676 |
| 2019/0385164 A1* | 12/2019 | Royyuru | G06Q 20/36 |
| 2020/0151689 A1* | 5/2020 | Dao | G06Q 20/105 |
| 2020/0387889 A1* | 12/2020 | Kang | G06Q 20/08 |
| 2021/0012312 A1* | 1/2021 | Bradstreet | G06Q 20/4016 |

* cited by examiner

SYSTEMS AND METHODS FOR CARD REPLACEMENT

BACKGROUND OF THE INVENTION

1. Field of the Invention

The present disclosure generally relates to systems and methods for card replacement.

2. Description of Related Art

When a cardholder of a credit card loses or has his or her credit card not received, and does not have the card tokenized in an electronic wallet (e.g., the ApplePay digital wallet), the cardholder generally must wait to receive a new card before he or she is able to provision the card to the electronic wallet and conduct a transaction with the new card.

SUMMARY OF THE INVENTION

Systems and methods for card replacement are disclosed. In one embodiment, in a card issuer backend comprising at least one computer processor, a method for card replacement may include: (1) receiving, from a cardholder, a request to replace a lost or not received card; (2) determining that the lost or not received card has not been provisioned to an electronic wallet associated with the cardholder; (3) generating a token for the lost or not received card; (4) provisioning the token to the electronic wallet; (5) generating a replacement card number for the lost or not received card; (6) requesting that a token service provider assign the token for the lost or not received card to the replacement card number; and (7) updating a customer profile with the replacement card information. The token service provider may change an association of a token from being associated with the lost or not received card to being associated with the replacement card, and may provide the electronic wallet with replacement card information via an electronic wallet provider.

In one embodiment, the request to replace the card may be received from an issuer application executed by the electronic device associated with the cardholder, from a browser, etc.

In one embodiment, the step of determining that the lost or not received card has not been provisioned to the electronic wallet on the electronic device associated with the cardholder may include determining that the lost or not received card is eligible for provisioning to the electronic wallet on the electronic device.

In one embodiment, the method may further include receiving lost or not received card information needed to generate the token for the lost or not received card. In one embodiment, the lost or not received card information may include a card number and an expiration date. The lost or not received card information may be received by mimicking entry of card information by the cardholder.

In one embodiment, the step of generating a replacement card number for the lost or not received card may include marking the lost or not received card as lost or not received; and generating the replacement card number for the lost or not received card.

In one embodiment, the replacement card information may include replacement card data and replacement card art for the replacement card.

According to another embodiment, a system for card replacement may include a card issuer backend comprising at least one computer processor; an electronic wallet provider; an electronic device associated with a cardholder executing a card issuer application and an electronic wallet application; and a token service provider. In one embodiment, the issuer backend may be configured to: receive a request to replace a lost or not received card from the cardholder; determine that the lost or not received card has not been provisioned to the electronic wallet; generate a token for the lost or not received card; to provision the token to the electronic wallet; generate a replacement card number for the lost or not received card; and request that the token service provider assign the token for the lost or not received card to the replacement card number. The token service provider may be configured to change an association of a token from being associated with the lost or not received card to being associated with the replacement card, and to inform the electronic wallet provider of the change in association for the token The electronic wallet provider may be configured to provide the electronic wallet with replacement card information.

In one embodiment, the request to replace the lost or not received card may be received from the issuer application, from a browser, etc.

In one embodiment, the issuer backend may be configured to determine that the lost or not received card is eligible for provisioning to the electronic wallet on the electronic device before generating a token for the lost or not received card.

In one embodiment, the issuer backend may be configured to generate a token for the lost or not received card by receiving lost or not received card information.

In one embodiment, the lost or not received card information may include a card number and an expiration date.

In one embodiment, the lost or not received card information may be received by mimicking entry of card information by the cardholder.

In one embodiment, the replacement card number for the lost or stolen card may be generated by marking the lost or stolen card as lost or not received and by generating the replacement card number for the lost or stolen card.

In one embodiment, the replacement card information may include replacement card data and replacement card art for the replacement card.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for replacement are disclosed.

Figure 1:
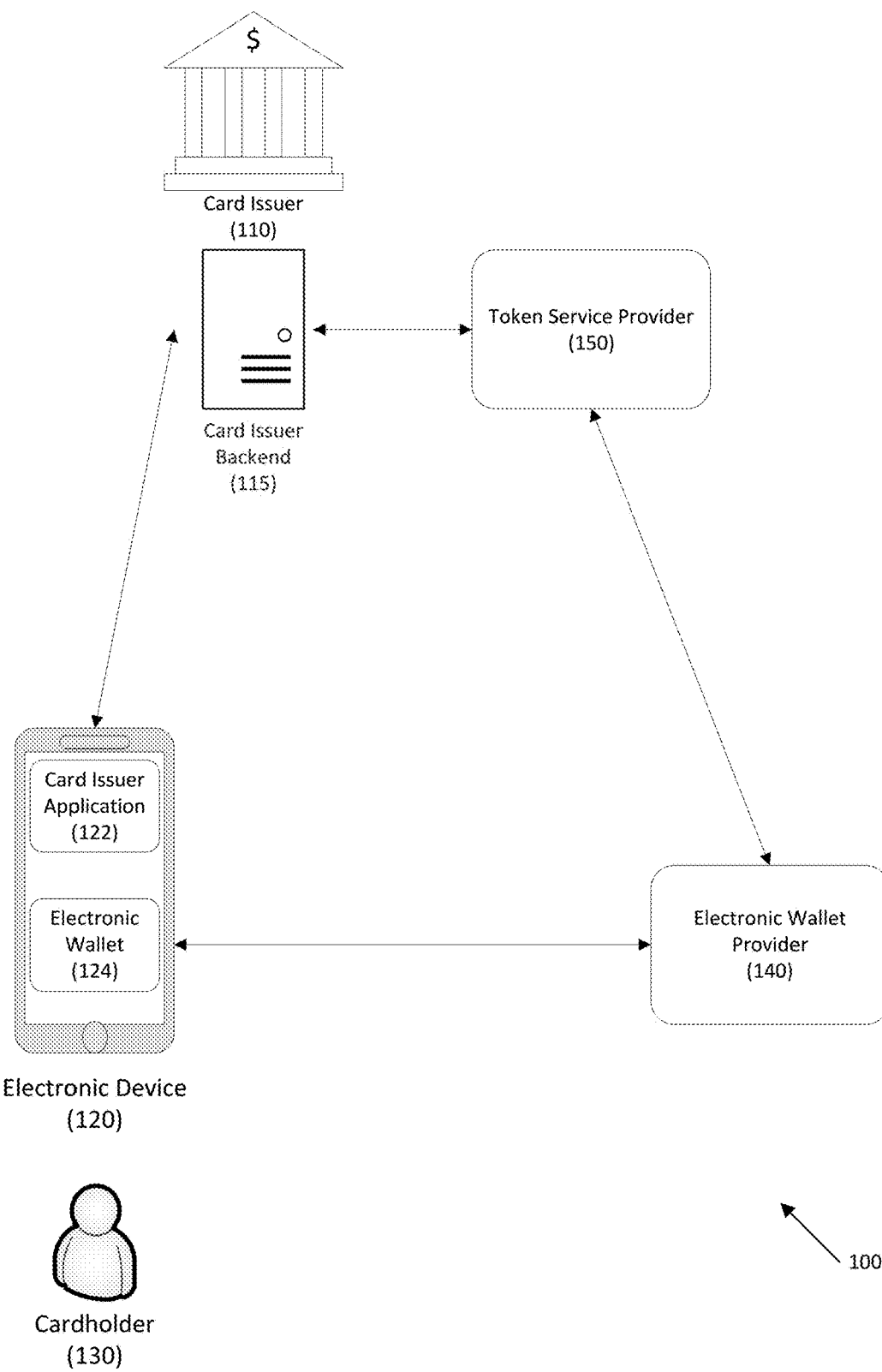
FIG. 1 discloses a system for card replacement according to one embodiment.

Referring to FIG. 1, a system for card replacement is disclosed according to one embodiment. System 100 may include card issuer 110, which may be a financial institution, card issuer backend, electronic device 120 used by cardholder 130 that executes one or more application, such as electronic wallet 122, card issuer application 124, a browser (not shown), etc., electronic wallet provider 140, and token service provider 150. Electronic device 120 may be any suitable electronic device, such as mobile electronic devices (e.g., smartphones, smart watches, etc.), notebook computers, desktop computers, Internet of Things (IoT) appliances, etc.

Card issuer backend 115 may include one or more physical servers and systems, cloud-based servers and systems, etc.

Card issuer application 122 may be an application provided by card issuer 110 that may interface with card issuer backend 115. In one embodiment, instead of an application, user 130 may interface with card issuer backend using browser.

Electronic wallet 124 may be provided by electronic wallet provider 140, which may be a third party, or it may be provided by card issuer 110. An example of electronic wallet 124 is ApplePay.

In one embodiment, card issuer application 122 may communicate directly with electronic wallet 124.

Token service provider 150 may manage tokens for card issuer 110. An example of a token service provider 150 is Visa.

Figure 2:
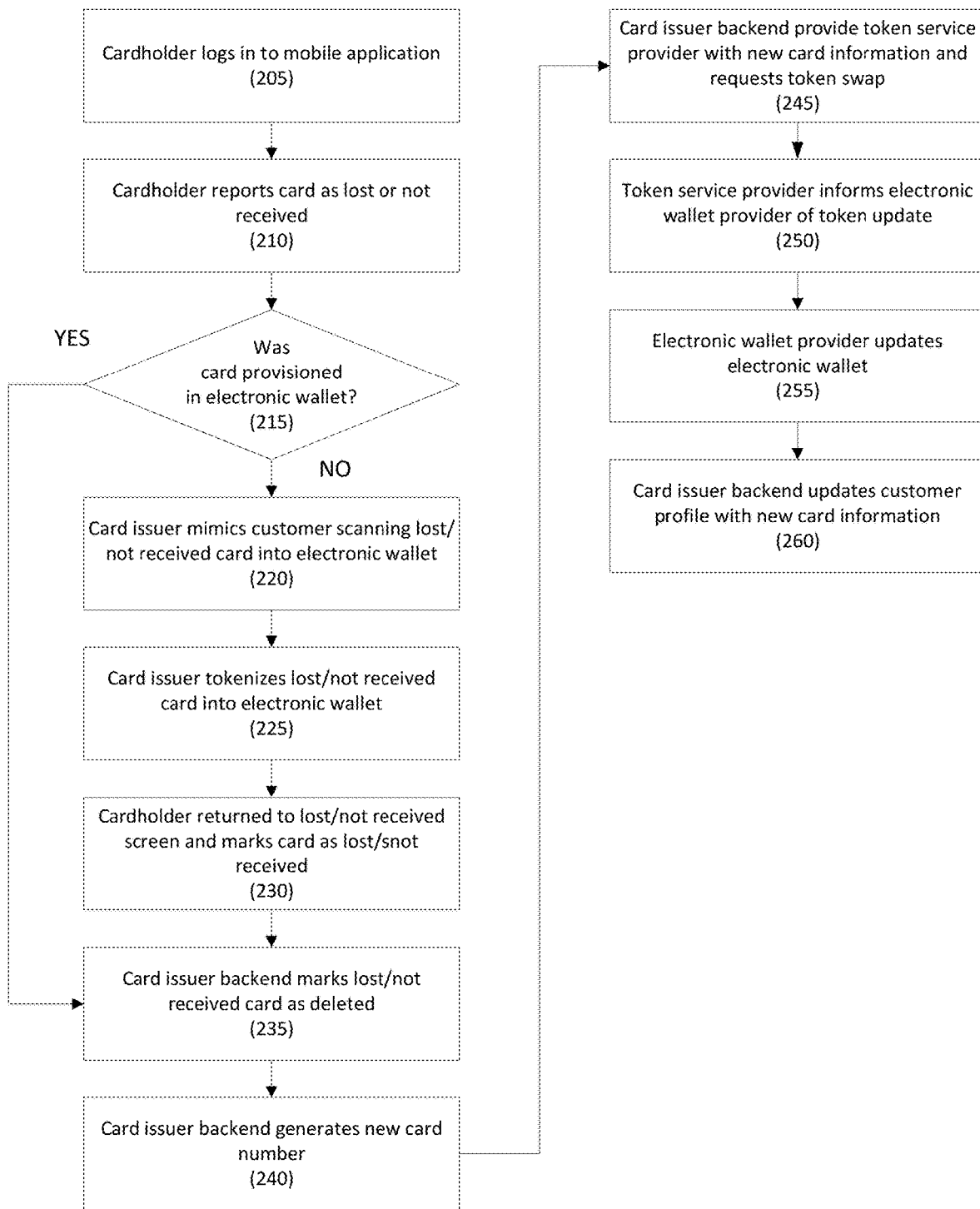
FIG. 2 discloses a method for card replacement according to one embodiment.

Referring to FIG. 2, a method for card replacement is disclosed according to one embodiment.

In step 205, a cardholder seeking to replace a lost or not received card may log into an application provided by the card issuer, or may log in to an account using a browser, etc. In one embodiment, the cardholder may provide login credentials.

In one embodiment, the application or browser may be executed on the same electronic device that executes the electronic wallet. In another embodiment, the application or browser may be executed on a different electronic device from the one that executes the electronic wallet.

In step 210, the cardholder may select an option to report the card as lost or not received. This may be done in the issuer app, the issuer website, etc. For example, the cardholder may select the lost or not received card from a list of cards issued by the card issuer to the cardholder.

In step 215, the issuer backend may check to see if the lost or not received card has been provisioned to an electronic wallet, such as a third-party wallet.

In one embodiment, the card may be verified as being eligible for provisioning. If it is not, the replacement card may be marked as deleted and a physical replacement card may be provided per conventional methods.

In step 220, if the card has not been provisioned to an electronic wallet, the issuer backend may mimic the customer scanning or entering the card information for the lost or not received card. For example, the issuer backend may retrieve the card information from a customer record. Example information may include the card number, expiration date, and any information that may be used in the tokenization process.

In step 225, the card issuer may tokenize the card, and may provision the tokenized card to the electronic wallet.

In step 230, the cardholder may be returned to the lost/not received screen, and may mark the card as lost or not received.

In step 235, the card issuer backend may mark a card status for the lost or not received card as deleted, and, in step 240, may generate a replacement card number for the lost or not received card.

In step 245, the card issuer backend may provide the token service provider (e.g., Visa) with, for example, the lost or not received card information, the replacement card information, and may request that the token for the lost or not received card be transferred to the replacement card.

In step 250, the token service provider may change an association of a token associated with the lost or not received card to be associated with the replacement card. The token service provider may inform the electronic wallet provider that the token for the lost or not received card was transferred to the replacement card.

In one embodiment, the token service provider and/or the card issuer may provide the replacement card information (e.g., card art, expiration date, last four digits of the replacement card number, etc.) to the electronic wallet provider.

In step 255, the electronic wallet provider may update the electronic wallet with the last four digits of the replacement card, the replacement card art, the replacement card expiration date, etc.

In another embodiment, the card issuer application may communicate the updated to the electronic wallet.

At the conclusion of step 255, the cardholder may use the replacement card number for tokenized payments.

In step 260, the card issuer backend may update the customer profile with the replacement card information. In one embodiment, the process of updating the customer profile may take several hours. Until the customer provide is updated, the lost or not received card may be greyed out or otherwise indicated as unavailable in the customer's account with the card issuer.

A physical card for the replacement card may be created and provided to the customer in due course.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for card replacement, comprising:
providing, by a card issuer, a card issuer application, wherein the card issuer application is configured to execute on a mobile electronic device, and wherein the card issuer application is further configured to display a list of cards and receive a selection from a cardholder of a lost or not received card from the list of cards;
receiving, by a card issuer backend computer processor, a request to replace the lost or not received card, wherein the request to replace the lost or not received card is received from the card issuer application as a result of the cardholder selecting the lost or not received card;
determining, by the card issuer backend computer processor, that the lost or not received card is eligible for provisioning to an electronic wallet;
in response to determining that the lost or not received card is eligible for provisioning to the electronic wallet, determining, by the card issuer backend computer processor, that the lost or not received card has not been provisioned to the electronic wallet associated with the cardholder;
retrieving, by the card issuer backend computer processor, card information from a customer record, the card information comprising a card number and an expiration date wherein the customer record is associated with a customer profile stored at the card issuer backend computer processor;
programmatically mimicking, by the card issuer backend computer processor, entry of the card information retrieved from the customer record by the cardholder, wherein the entry mimics entry of the card information as if the card information were entered by the cardholder;
generating, by the card issuer backend computer processor and in response to the mimicking of the entry of the card information into the electronic wallet, a token for the lost or not received card;
provisioning, by the card issuer backend computer processor, the token for the lost or not received card to the electronic wallet;
generating, by the card issuer backend computer processor, a replacement card number for the lost or not received card;
requesting, by the card issuer backend computer processor, that a token service provider assign the token for the lost or not received card to the replacement card number; and
updating, by the card issuer backend computer processor, the customer profile with the replacement card number;
wherein the token service provider changes an association of a token from being associated with the lost or not received card to being associated with the replacement card number, and provides the electronic wallet with replacement card information via an electronic wallet provider.

2. The method of claim 1, wherein the step of generating a replacement card number for the lost or not received card comprises:
marking, by the card issuer backend, the lost or not received card as lost or not received; and
generating, by the card issuer backend, the replacement card number for the lost or not received card.

3. The method of claim 1, wherein the replacement card information comprises replacement card data and replacement card art for the replacement card number.

4. A system for card replacement, comprising:
a card issuer backend comprising at least one computer processor;
an electronic wallet provider;
an electronic device associated with a cardholder executing a card issuer application and an electronic wallet application, wherein the card issuer application is configured to execute on a mobile electronic device, and wherein the card issuer application is further configured to display a list of cards and receive a selection from a cardholder of a lost or not received card from the list of cards; and
a token service provider;
wherein:

the card issuer backend is configured to receive a request to replace a lost or not received card from the cardholder and, wherein the request to replace the lost or not received card is received from the card issuer application as a result of the cardholder selecting the lost or not received card;

the card issuer backend is configured to determine that the lost or not received card is eligible for provisioning to an electronic wallet;

in response to determining that the lost or not received card is eligible for provisioning to the electronic wallet, the card issuer backend is configured to determine that the lost or not received card has not been provisioned to the electronic wallet application;

the card issuer backend is configured to retrieve card information from a customer record, the card information comprising a card number and an expiration date, wherein the customer record is associated with a customer profile stored at the card issuer backend;

the card issuer backend is configured, programmatically, to mimic entry of the card information retrieved from the customer record by the cardholder, wherein the entry mimics entry of the card information as if the card information were entered by the cardholder;

the card issuer backend is configured to generate, in response to the mimic of the entry of the card information into the electronic wallet, a token for the lost or not received card;

the card issuer backend is configured to provision the token for the lost or not received card to the electronic wallet application;

the card issuer backend is configured to generate a replacement card number for the lost or not received card;

the card issuer backend is configured to update the customer profile with the replacement card number;

the card issuer backend is configured to request that the token service provider assign the token for the lost or not received card to the replacement card number;

the token service provider is configured to change an association of a token from being associated with the lost or not received card to being associated with the replacement card number;

the token service provider is configured to inform the electronic wallet provider of a change in association for the token; and the electronic wallet provider is configured to provide the electronic wallet application with replacement card information.

5. The system of claim 4, wherein the replacement card number for the lost or not received card is generated by marking the lost or not received card as lost or not received and generating the replacement card number for the lost or not received card.

6. The system of claim 4, wherein the replacement card information comprises replacement card data and replacement card art for the replacement card number.

* * * * *